(12) United States Patent
Maekawa

(10) Patent No.: US 6,945,909 B2
(45) Date of Patent: Sep. 20, 2005

(54) TORQUE DISTRIBUTION CONTROL DEVICE FOR FOUR-WHEEL DRIVE VEHICLE

(75) Inventor: Akio Maekawa, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 13 days.

(21) Appl. No.: 10/695,991

(22) Filed: Oct. 30, 2003

(65) Prior Publication Data

US 2004/0092363 A1 May 13, 2004

(30) Foreign Application Priority Data

Oct. 31, 2002 (JP) ........................................ 2002-318494
Oct. 31, 2002 (JP) ........................................ 2002-318505

(51) Int. Cl.$^7$ ............................................ B60K 17/348
(52) U.S. Cl. .......................... 477/175; 477/180; 701/69
(58) Field of Search ............................. 701/69; 477/86, 477/87, 166, 175, 179, 180

(56) References Cited

U.S. PATENT DOCUMENTS

| | | | | |
|---|---|---|---|---|
| 4,987,967 A | * | 1/1991 | Kouno | 701/69 |
| 5,069,305 A | * | 12/1991 | Kobayashi | 701/69 |
| 5,448,478 A | * | 9/1995 | Eto | 701/69 |
| 6,347,271 B1 | * | 2/2002 | Showalter | 701/69 |
| 6,553,303 B2 | * | 4/2003 | Matsuno | 477/175 |
| 6,697,725 B1 | * | 2/2004 | Williams | 701/69 |
| 6,834,225 B1 | * | 12/2004 | Jiang et al. | 701/67 |

FOREIGN PATENT DOCUMENTS

JP 2001-71781 3/2001

\* cited by examiner

*Primary Examiner*—Sherry Estremsky
(74) *Attorney, Agent, or Firm*—Oblon, Spivak, McClelland, Maier & Neustadt, P.C.

(57) ABSTRACT

A torque distribution control device for a four-wheel drive vehicle having a torque distribution device for distributing the drive power transmitted from an engine to either of the front wheels or the rear wheels as prime drive wheels, to other wheels as sub-drive wheels determines a pre-torque in a feed forward sense based on the vehicle speed, the throttle opening degree and the gear shift step of a transmission. A compensation torque is determined in a feedback sense based on the vehicle speed and the rotational speed difference between the drive wheels and the sub-drive wheels. A torque transmission clutch is controlled based on a command torque which is obtained by the addition of the pre-torque and the compensation torque, so that the command torque is distributed to the sub-drive wheels.

11 Claims, 8 Drawing Sheets

TORQUE DISTRIBUTION CONTROL DEVICE FOR FOUR-WHEEL DRIVE VEHICLE

INCORPORATION BY REFERENCE

This application is based on and claims priority under 35 U.S.C. sctn. 119 with respect to Japanese Applications No. 2002-318494 and No. 2002-318605 both filed on Oct. 31, 2002, the entire contents of which are incorporated herein by reference.

BACKGROUND OF THE INVENTION

1. Field of the Invention

The present invention relates to a torque distribution control device for controlling the distribution of drive torque to sub-drive wheels of a four-wheel drive vehicle.

2. Discussion of the Related Art

A torque distribution control device for a four-wheel drive vehicle has been known as described in Japanese unexamined, published patent application No. 2001-71781, wherein a torque transmission clutch is provided for distributing the torque transmitted from an engine to prime drive wheels, to sub-drive wheels in dependence on the rotational speed difference between the prime drive wheels and the sub-drive wheels. In the known control device, when the acceleration of the vehicle exceeds a predetermined value, an acceleration mode map which has been set to enlarge the rate of the increase in the torque distributed to the sub-drive wheels to the increase in the rotational speed difference between the prime drive wheels and the sub-drive wheels is selected, so that a lager torque relative to the rotational speed difference is distributed to the sub-drive wheels. When the acceleration of the vehicle remains below the predetermined value, on the contrary, a tight mode map which has been set to diminish the rate of the increase in the torque distributed to the sub-drive wheels to the increase in the rotational speed difference is selected, so that a small torque relative to th rotational speed difference is distributed to the sub-drive wheels.

According to the control method in the known torque distribution control device, the acceleration and the starting of the vehicle on a road with a small coefficient of friction can be performed stably with the sub-drive wheels being given a large torque, and a slow-speed turn at a tight-corner can be performed with the sub-drive wheels being given a small torque, thereby avoiding the occurrence of a so-called "tight-corner braking phenomenon".

However, when a turn at a corner is made at a medium speed with the acceleration smaller than the predetermined value, it cannot be attained only by judging whether the acceleration of the vehicle is less than the predetermined value or not, to distribute to the sub-drive wheels the torque sufficient to enhance safety. As noted above, in the known method, the traveling state cannot be grasped sufficiently, so that it cannot be done to distribute to the sub-drive wheels the torque which directly reflects the vehicle traveling state or the driver's will.

Further, because the magnitude of the torque distributed adequately to the sub-drive wheels is varied in dependence on the states of the vehicle acceleration and the throttle opening degree, it cannot be done only by judging whether the acceleration exceeds the predetermined value or not, to distribute the adequate torque which reflects the drivers will satisfactorily. For example, when the acceleration is smaller than the predetermined value, it cannot be distinguished whether such is due to the fact that the load is large when the acceleration is to be made or due to the fact that the throttle opening degree is made small to enter a constant speed traveling after the acceleration to reach a target vehicle speed zone. Consequently, it could not occasionally be realized to reflect the driver's will or the traveling state, namely to increase the torque distributed to the sub-drive wheels when the acceleration is to be made, or to decrease the torque distributed to the sub-drive wheels when a constant speed traveling is to be made upon completion of the acceleration.

SUMMARY OF THE INVENTION

Accordingly, it is a primary object of the present invention to provide a torque distribution control device for a four-wheel drive vehicle capable of distributing torques to sub-drive wheels or four wheels adequately in dependence on the vehicle traveling state so that the improvement in stability and the reduction in fuel consumption can be accomplished.

Briefly, according to the present invention, there is provided a torque distribution control device for a four-wheel drive vehicle having a torque transmission clutch for distributing the torque transmitted from an engine to prime drive wheels and to sub-drive wheels. The control device comprises pre-torque operation means for determining a pre-torque to be transmitted to the sub-drive wheels based on a vehicle speed, a throttle opening degree and the gear shift step of a transmission; and compensation torque operation means for determining a compensation torque based on the rotational speed difference between the prime drive wheels and the sub-drive wheels. The control device further comprises command torque operation means for determining a command torque by the addition of the pre-torque and the compensation torque, so that the torque transmission clutch is controlled based on the command torque input from the command torque operation means.

With this configuration, the torque transmitted from the engine to the drive wheels is distributed through the torque transmission clutch to the sub-drive wheels on an on demand basis. The pre-torque is determined in a feed-forward sense based on the vehicle speed, the throttle opening degree and the gear shift step of the transmission. The compensation torque is determined in a feedback sense based on the rotational speed difference between the drive wheels and the sub-drive wheels. The torque transmission clutch is controlled in dependence on the command torque which is calculated by the addition of the pre-torque and the compensation torque, and the command torque is distributed to the sub-drive wheels. Thus, at the vehicle start with a slow gear shift selected or in the traveling state of a cornering with a medium gear shift selected, torques are distributed to the four wheels to enhance the stability, while in the traveling state of a cruise with a high gear shift selected, the torque is hardly distributed to the sub-drive wheels to reduce the fuel consumption. In this manner, torque transmitted to the sub-drive wheels can be distributed adequately to reflect the drivers will directly.

In another aspect of the present invention, there is provided a torque distribution control device for a four-wheel drive vehicle having a torque transmission clutch for distributing the torque transmitted from an engine to prime drive wheels, to sub-drive wheels. The control device comprises pre-torque operation means for determining a pre-torque to be transmitted to the sub-drive wheels based on a vehicle speed and a throttle opening degree; and compensated pre-torque operation means for compensating the pre-torque based on the throttle opening degree and the acceleration/deceleration of the vehicle to obtain a compensated pre-torque. Feedback torque operation means is further provided for determining a feedback torque based on the rotational speed difference between the prime drive wheels and the sub-drive wheels. Command torque operation means is also provided for calculating a command torque by the addition of the compensated pre-torque and the feedback torque, so that the torque transmission clutch is controlled based on the command torque.

With this configuration, the torque transmitted from the engine to the drive wheels is distributed through the torque transmission clutch to the sub-drive wheels on an on-demand basis. The pre-torque is determined in a feed-forward sense based on the vehicle speed and the throttle opening degree. The pre-torque is compensated based on the throttle opening degree and the acceleration/deceleration of the vehicle. The feedback torque is determined in a feedback sense based on the rotational speed difference between the prime drive wheels and the sub-drive wheels. The torque transmission clutch is controlled in dependence on a command torque which is obtained by the addition of the compensated pre-torque and the feedback torque, and the command torque is distributed to the sub-drive wheels. As a consequence, when the throttle opening degree is increased for acceleration but nevertheless the vehicle acceleration remains small, the pre-torque is compensated to be increased, so that the torque distribution to the sub-drive wheels is increased to realize a sufficient acceleration reflecting the driver's will. In addition, when the throttle opening degree is decreased by releasing an accelerator for engine braking, then the deceleration (the negative acceleration) during the traveling on a flat road or an ascent is made medium or large, or when the acceleration during the traveling on a descent is made medium or large, the pre-torque is compensated to be increased, whereby the torque distribution to the sub-drive wheels is made large for reliable engine braking with the four wheels. Further, when the driver releases the accelerator for a constant speed traveling which causes the value of the acceleration to be small regardless of the positive acceleration or negative acceleration, the pre-torque is compensated to be decreased, whereby the torque distribution to the sub-drive wheels is made small thereby to reduce the fuel consumption.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Figure 1:
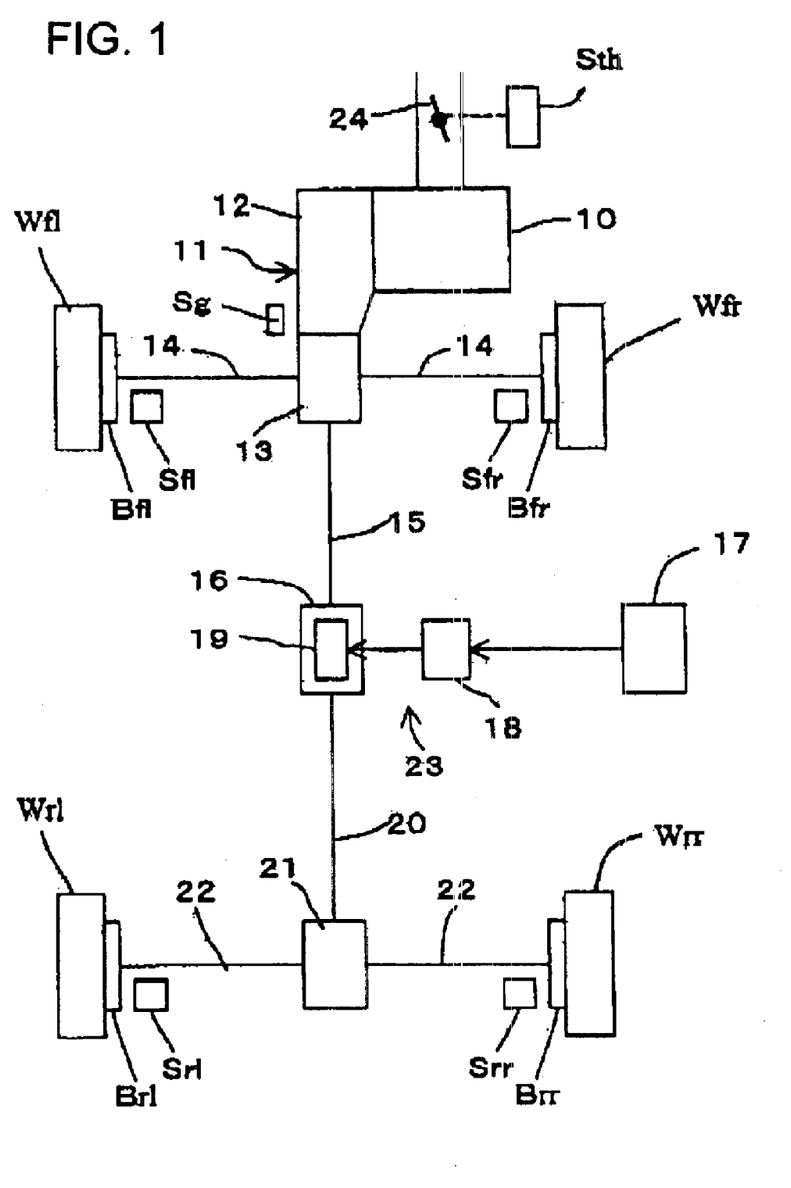
FIG. 1 is a schematic view of a four-wheel drive vehicle incorporating a torque distribution control device according to first and second embodiments of the present invention.

A first embodiment of the present invention will be described with reference to the accompanying drawings. FIG. 1 schematically shows the construction of a four-wheel drive vehicle which incorporates a torque distribution control device pertaining to the embodiments of the present invention. In FIG. 1, a transaxle 11 is assembled at an output side of an engine 10. The transaxle 11 integrally incorporates a transmission 12, a transfer and a front differential 13 therein. The transaxle 11 outputs the output torque of the engine 10 through the front differential 13 to front axle shafts 14, 14 to drive left and right front wheels Wfl, Wfr and further to a first propeller shaft 15. The first propeller shaft 15 is connected to a second propeller shaft 20 through an electromagnetic clutch 16. The electromagnetic clutch 16 is controlled in dependence on a command torque which an electronic control device 17 determines in dependence on the traveling state of the vehicle, thereby to distribute the command torque to rear wheels Wrl, Wrr as sub-drive wheels through the second propeller shaft 20. An electric current control circuit 18 applies to an exciting coil 19 of the electromagnetic clutch 16 a command current corresponding to the command torque determined by the control device 17. The electromagnetic clutch 16 pressures and connects plural clutch plates in dependence on the command current, so that the command torque is transmitted from the first propeller shaft 15 to the second propeller shaft 20. The torque transmitted to the second propeller shaft 20 is further transmitted to the rear differential 21 and is output from the rear differential 21 to the rear axle shafts 22, 22 to be distributed to the left and right rear wheels Wrl, Wrr as the sub-drive wheels. A torque distribution device 23 for distributing the torque transmitted from the engine 10 to the prime drive wheel is Wfl, Wfrl to the sub-drive wheels Wrl, Wrr is composed of the electric current control circuit 18, the electromagnetic clutch 16 and so on.

Wheel speed sensors Sfl, Sfr, Srl, Sr are provided respectively for detecting the wheel speeds of the prime drive wheels Wfl, Wfr and the sub-drive wheels Wrl, Wrr. The wheel speed sensors Sfl, Sfr, Srl, Srr also operate as the wheel speed sensors for an anti-lock brake system (ABS) for controlling the brakes Bfl, Bfr, Brl, Brr independently of one another. Further, a throttle body in an intake system for the engine 10 is provided with a throttle opening sensor Sth for detecting the opening degree ($\theta$) of a throttle valve 24 which adjusts the intake volume in dependence upon the stepping-on measurement of an accelerator or gas pedal (not shown). The transmission 12 is provided with a gear position sensor Sg for detecting the position of a shift lever (not shown) which performs gear shifts for speed change.

Figure 2:
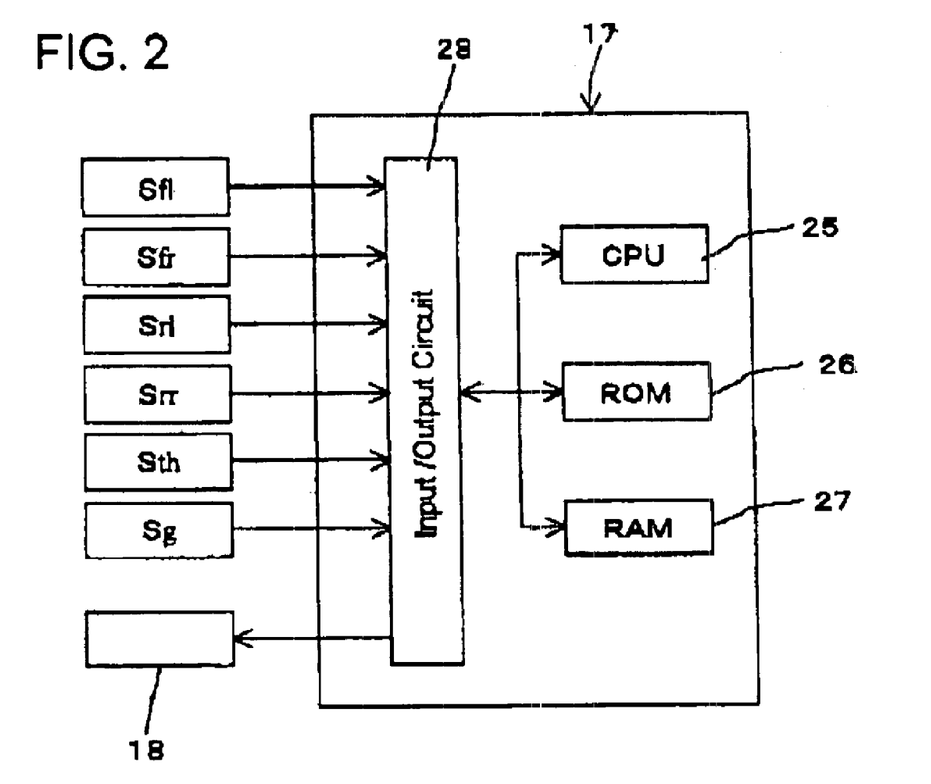
FIG. 2 is a block diagram of an electronic control circuit used commonly in the first and second embodiments.
Figure 6:
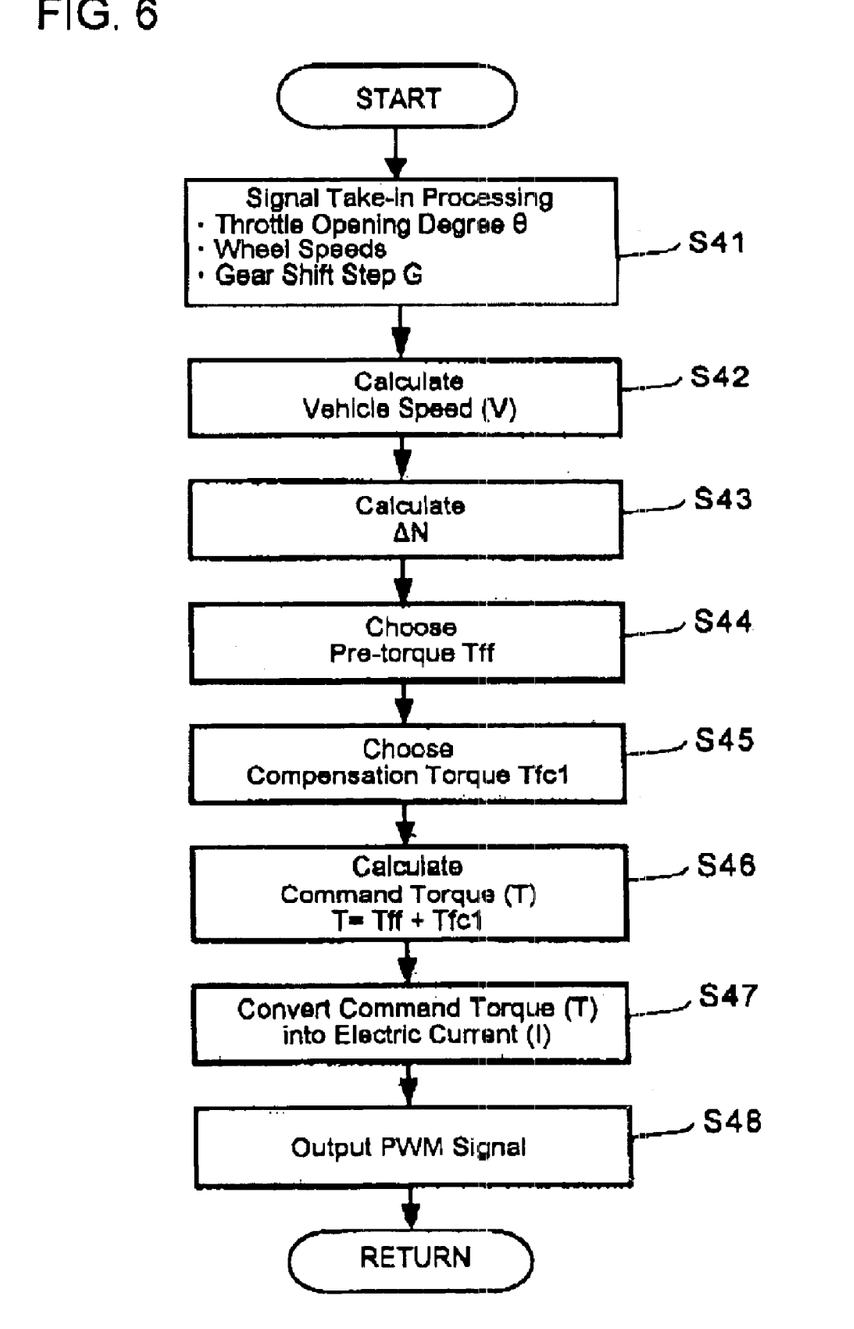
FIG. 6 is a flow chart showing a torque distribution program executed by the electronic control circuit in the first embodiment.

Referring now to FIG. 2, an electronic control circuit 17 is shown connected to the wheel speed sensors Sfl, Sfr, Srl, Srr, the throttle opening sensor Sth and the gear position sensor Sg and is further connected to an electric current control circuit 18 of a torque distribution device 23. The electronic control circuit 17 is composed of a CPU 25 for executing various kinds of operation processing to control the torque distribution device 23, a ROM 26 which in advance has stored a torque distribution control program shown in FIG. 6 executed by the CPU 26, a RAM 27 with which the read-out and write-in of data as required are carried out during the execution by the CPU 25 of the torque distribution control, and an input/output circuit 28 for inputting thereinto the wheel speed signals, the throttle opening signal and the gear shift step signal from the wheel speed sensors Sfl, Sfr, Srl, Srr, the throttle opening sensor Sth and the gear position sensor Sg and for outputting a command electric current (I) as a result of the operations executed by the CPU 25, to the electric current control circuit 18.

Figure 3:
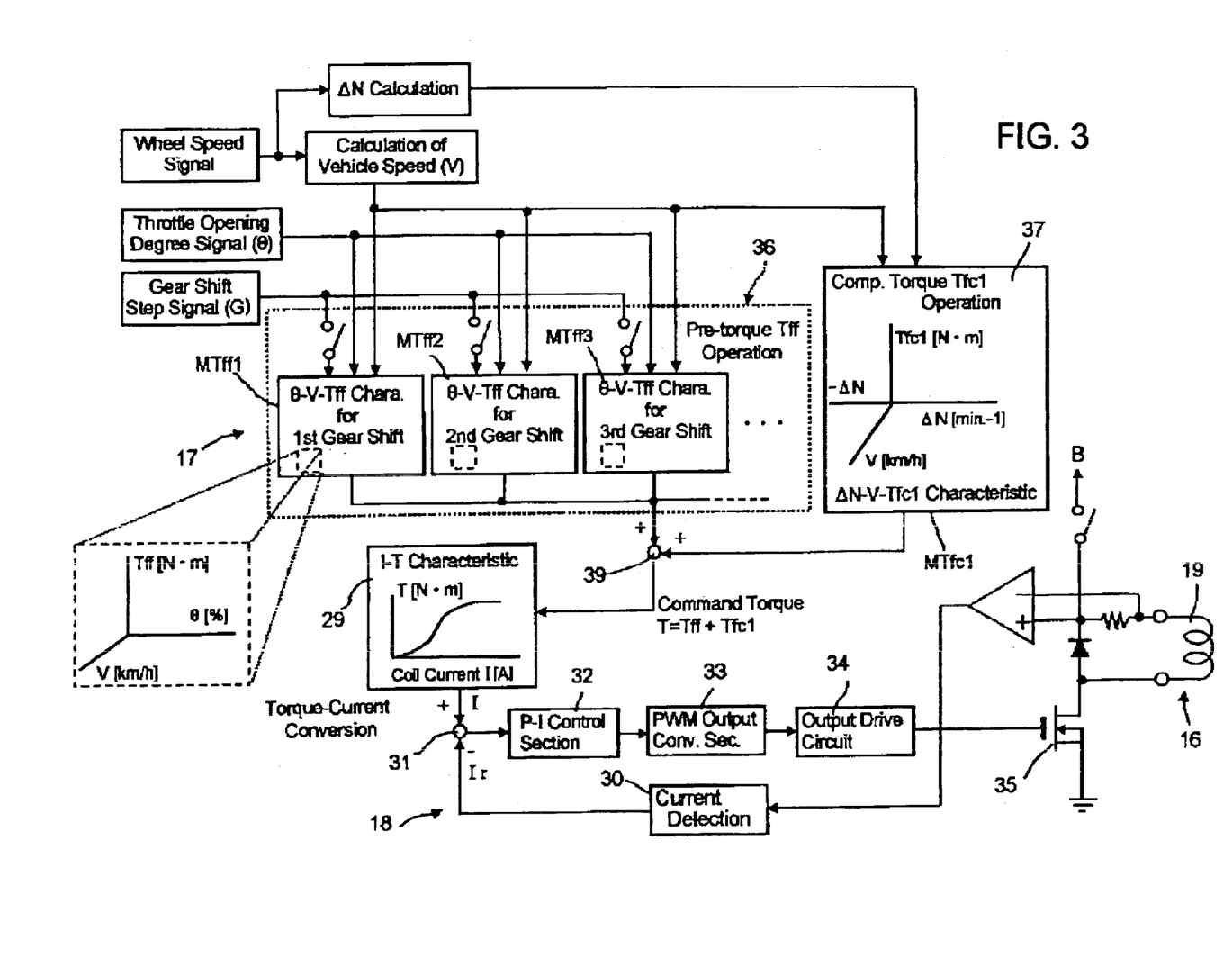
FIG. 3 is a block diagram showing the functions of those constituting the torque distribution control device according to the first embodiment.

As shown in FIG. 3, the electronic control device 17 determines or calculates a command current which is to be applied to the electromagnetic coil 19 for transmission by the electromagnetic clutch 16 of the calculated command torque (T) to the sub-drive wheels Wrl, Wrr and outputs the calculated command current (I) to the electric current control circuit 18, The relation between the command torque (T) transmitted by the electromagnetic clutch 16 and the command electric current (I) has been stored in the ROM 26 in the form of a torque-current map 29, and the command electric current (I) corresponding to the command torque (T) is read out from torque-current map 29. In an alternative form, the command current (I) may be calculated using an equation which formulates the relation between the command torque (T) and the command electric current (I).

In the electric current control circuit 18, a current detection section 30 detects the real electric current (Ir) flowing through the electromagnetic coil 19 of the electromagnetic clutch 16, a subtraction section 31 calculates the difference between the command current (I) input from the electronic control device 17 and the real electric current (Ir). The calculated difference is amplified by a P-I control section 32 and is processed by a PWM output converter section 33 for pulse width modulation. Thus, a voltage under the pulse wide modulation is applied from the output drive section 34 to a base of a switching transistor 35. Since the switching transistor 35 is connected to a buttery (B) in series with the electromagnetic coil 19, the command electric current (I) is applied to the electromagnetic coil 19.

The electronic control device 17 is provided with pre-torque operation means 36 for determining or calculating a pre-torque Tff to be transmitted to the subdrive wheels Wrl, Wrr, based on the vehicle speed (V), the throttle opening degree (θ) and the selected gear shift step (G) of the transmission 12. The control device 17 is further provided with compensation torque operation means 37 for determining or calculating a compensation torque (Tfc1) based on the vehicle speed (V) and the rotational speed difference (ΔN) between the drive wheels Wfl, Wfr and the sub-drive wheels Wrl, Wrr. The control device 17 is also provided with addition means 39 for calculating a command torque (T) by the addition of the pre-torque Tff and the compensation torque Tfc1.

The vehicle speed (V) is calculated from the average value of the rotational numbers of the sub-drive wheels Wrl, Wrr detected by the wheel speed sensors Srl, Srr. The throttle opening degree signal represents by percentages the opening degree (θ) detected by the throttle sensor Sth of the throttle valve 24 relative to the full opening thereof. The gear shift step signal is obtained from the position of the shift lever of the transmission 12 detected by the gear position sensor Sg. In a modified form of the embodiment, the gear shift step signal (G) may be obtained based on the vehicle speed (V) and the engine rotational speed, or in the case of a vehicle with an automatic transmission, it may be obtained by calculation from an ECU (Electronic Control Unit) for the automatic transmission.

Figure 4:
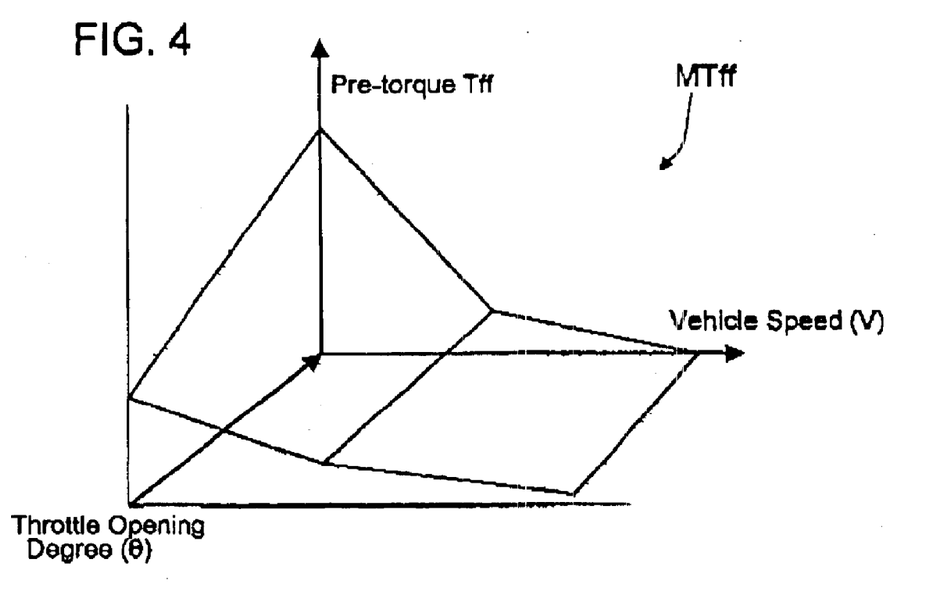
FIG. 4 is an explanatory view representing one example of a first pre-torque map selected at a first gear shift commonly in the first and second embodiments.

In the pre-torque operation means 36, plural pre-torque maps MTff1, MTff2, MTff3, . . . for respective gear shift steps (G) are registered in the ROM 26. Each of the maps MTff1, MTff2, MTff3, . . . has preset therein various pre-torques Tff to be transmitted to the sub-drive wheels Wrl, Wrr in correspondence to various vehicle speeds (V) and various throttle opening degrees (θ). Thus, when the torque distribution program is executed, one of the pre-torque maps MTff which corresponds to the detected gear shift step is selected, and by the use of a selected pre-torque map MTff, a pre-torque Tff is determined or chosen based on the vehicle speed (V) and the throttle opening degree (θ). FIG. 4 typically exemplifies the pre-torque map MTff1 for the first gear shift step. This map MTff1 has been set to make the pre-torque Tff large at around zero of the vehicle speed (V). This map MTff1 has been set so that in a speed zone which is below a predetermined speed, the pre-torque Tff decreases as the vehicle speed increases, and the rate of the increase in the pre-torque Tff to the increase in the throttle opening degree (θ) is large . The map MTff1 has been further set so that in another speed zone beyond the predetermined speed, the pre-torque Tff is small, and the rate of the increase in the pre-torque Tff to that in the throttle opening degree (θ) is also small.

In order to enhance the traveling stability of the vehicle and to improve the fuel efficiency, the adequate torque to be transmitted to the sub-drive wheels depends on the traveling state even when the same vehicle speed (V) and the same throttle opening degree (θ) are maintained. More specifically, at the time of a starting with a low gear shift selected or at the time of a cornering with a medium gear shift selected, it is necessary to reliably distribute the torques to the four wheels for enhanced stability. On the contrary, at the time of a cruising with a high gear shift selected, so much torque distribution to the subdrive wheels is not necessary, and rather, it is desirable to decrease the torque distribution to the sub-drive wheels for improved fuel efficiency. In order to influence this characteristic on the pre-torque maps MTff1, MTff2, MTff3, the same are set differently from one another as follows: That is, as the gear shift is stepped up, the pre-torques Tff at lower speeds are made smaller, the rate of the increase in the pre-torque to the increase in the throttle opening degree (θ) is made also smaller, and the pre-torques Tff at those higher than the predetermined speed are made also smaller. Since the pre-torque maps MTff1, MTff2, MTff3 each set in this manner are registered in the ROM 26 for respective gear shift steps, the operator's will represented by the selected gear shift step can be reflected directly, so that the torque adequate to the operator's will can be distributed to the sub-drive wheels Wrl, Wrr.

In a modified form of the embodiment, the plural pre-torque maps MTff may not be provided for respective gear shift steps. Instead, one reference pre-torque map for e.g., the third gear shift step may be provided and used in such a manner that the pre-torque obtained from the reference pre-torque map is multiplied with 1.5 at the first gear shift step and with 0.5 at the fifth gear shift step. Further, the pre-torque Tff may not be obtained by reference to the pre-torque map MTff, but may be calculated using a predetermined arithmetic equation which takes the vehicle speed (V) and the throttle opening degree (θ) as parameters thereof.

Figure 5:
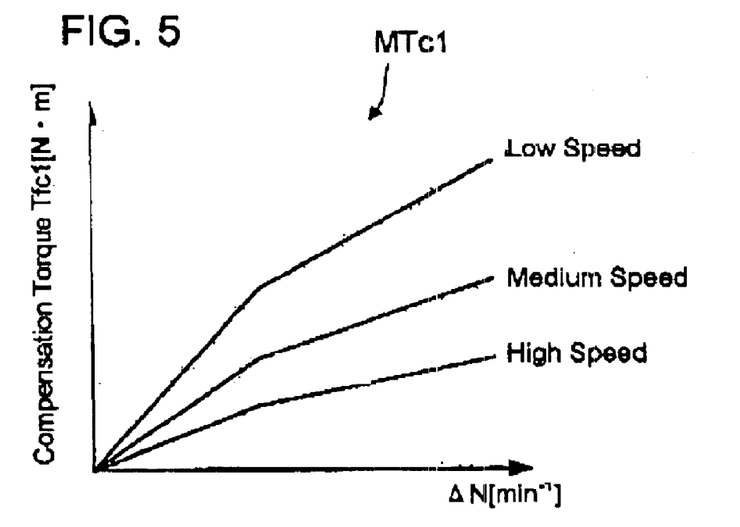
FIG. 5 is an explanatory view representing a compensation torque map used in the first embodiment.

In the compensation torque operation means 37, a compensation torque map MTfc1 wherein compensation torques Tfc1 for the various rotational differences ΔN between the drive wheels and the sub-drive wheels are set taking the vehicle speed (V) as parameter is registered in the ROM 26, and when a torque distribution control program is executed as described later, the compensation torque Tfc1 is obtained from the compensation torque map MTfc1 based on the rotational speed difference ΔN between the drive wheels and the sub-drive wheels and the vehicle speed (V). As shown in FIG. 5, the compensation torque map MTfc1 has a general characteristic that the compensation torque Tfc1 is zero when the rotational speed difference N between the drive wheels and the sub-drive wheels is zero, and that the compensation torque Tfc1 increases along a constant inclination in proportion to the increase in the rotational speed difference ΔN, but the inclination of the increase in the compensation torque Tfc1 is made small when the rotational speed difference ΔN exceeds the predetermined value. The compensation torque Tfc1 has been set to be larger as the vehicle speed (V) decreases, but smaller as the vehicle speed (V) increases.

The operation of the torque distribution control device for a four-wheel drive vehicle as constructed above will be described hereinafter. The CPU 25 executes the torque distribution program shown in FIG. 6 at a minute time interval. First of all, the CPU 25 at step S41 executes a processing for taking therein the signals from the wheel speed sensors Sfl, Sfr, Srl, Srr, the throttle sensor Sth and the gear position sensor Sg. Then, at step S42, the vehicle speed (V) is calculated based on the average value of the rotational numbers of the sub-drive wheels Wrl, Wrr detected by the wheel speed sensors Srl, Srr. At step S43, the average value of the rotational numbers of the sub-drive wheels Wrl, Wrr is subtracted from the average value of the rotational numbers of the drive wheels Wfl, Wfr detected by the wheel speed sensors Sfl, Sfr to calculate the rotational speed difference ΔN between the drive wheel and the sub-drive wheels. One of the pre-torque maps MTff is selected at step S44 in correspondence to the selected gear shift step (G) detected by the gear position sensor Sg, and with the selected map MTff, a pre-torque Tff which meets the calculated vehicle speed (V) and the throttle opening degree (θ) detected by the throttle sensor Sth is chosen or determined in a feed forward sense. A compensation torque Tfc1 which meets the rotational speed difference ΔN and the vehicle speed (V) is chosen or determined in a feedback sense at step S45. Step S46 constituting the command torque operation means 39 is then reached, wherein the pre-torque Tff and the compensation torque Tfc1 are added to calculate a command torque (T). At step S47, a command electric current (I) which is to be applied to the electromagnet 19 of the electromagnetic clutch 16 to transmit the command torque (T) is chosen and read out from the torque current map 29 which has stored various command electric currents (I) for various command torques (T), and the chosen electric current (I) is output to the electric current control circuit 18 at step S48. The electric current control circuit 18 amplifies the difference between the command current (I) and the real current (Ir) flowing through the electromagnetic coil 19 of the electromagnetic clutch 16 and performs the pulse wide modulation of the amplified difference to output the modulated difference to the switching transistor 35, whereby the command current (I) is applied to the electromagnetic coil 19. As a consequence, the electromagnetic clutch 16 transmits the command torque (T) from the first propeller shaft 15 to the second propeller shaft 20, so that the command torque (T) is distributed to the rear wheels Wrl, Wrr as the sub-drive wheels.

At this time, when for example, the first gear shift step is selected to make the vehicle start, a large torque (T) is distributed to the sub-drive wheels, because on the first pre-torque map MTff1 selected in correspondence to the first gear shift step, large pre-torques Tff1 have been set for the traveling state that the vehicle speed (V) is small and the throttle opening degree (θ) is large. Therefore, the vehicle can start without slipping. Further, on the pre-torque map MTff3 selected for a medium gear shift (e.g., the third gear shift step), the pre-torques Tff have generally been set to be median regardless of the throttle opening degree (θ) so far as the vehicle speed (V) is in the medium speed zone. Thus, when the vehicle corners with the medium gear shift step being selected, an adequate torque is distributed to the sub-drive wheels, so that the vehicle can corner stably with the four wheels surely gripping the road surface. On the pre-torque map MTffn selected for a high gear shift (e.g., the fifth or top gear shift step), the pre-torques Tff for high vehicle speeds (V) have been set to be small even where the throttle opening degree (θ) is considerably large. Therefore, the fuel efficiency can be improved during a cruising at the high gear shift.

As described hereinbefore, the pre-torque maps MTff which directly reflect the driver's will represented by the gear shift selection have been set for the respective gear shift steps, and a pre-torque is obtained from one of the pre-torque maps MTff corresponding to the selected gear shift step, whereby the torque which is the most suitable to the traveling state can be distributed to the sub-drive wheels.

In the first embodiment described above, the compensation torque Tfc1 is chose and determined in the feedback sense based on the rotational speed difference ΔN and the vehicle speed (V), so that the torque distribution to the sub-drive wheels can be performed while reflecting the driver's will based on the traveling stated being grasped more precisely. Further, in the first embodiment, the plural pre-torque maps MTff in each of which various pre-torques Tff to be distributed to the sub-drive wheels have been set in correspondence to various vehicle speeds (V) and various throttle opening degrees (θ) are provided for the respective gear shift steps of the transmission 12, and a pre-torque Tff is chosen or determined from one of the pre-torque maps MTff corresponding to the selected gear shift step. Thus, a pre-torque map which is the most adequate to directly reflect the driver's will represented by the selected gear shift step can be set for each of the gear shift steps.

Further, in the embodiment described above, a pre-torque map which has set various pre-torques for distribution to the sub-drive wheels in correspondence to various vehicle speeds (V) and the various throttle opening degrees (θ) is provided for at least one gear shift step. A pre-torque is chose or determined in dependence on a detected vehicle speed (V) and a detected throttle opening degree (θ), and the determined pre-torque is modified to compensate for the difference between a selected gear shift step and the at least one gear shift step. Thus, the torque distribution to the sub-drive wheels can be done adequately based on the at least one torque map to directly reflect the driver's will represented by the selected gear shift step.

Also in the embodiment described above, the pre-torque distributed to the sub-drive wheels is chosen or determined based on the vehicle speed (V) which is calculated from the wheel speeds of the sub-drive wheels detected by the wheel speed sensors Srl, Srr, the throttle opening degree (θ) detected by the throttle sensor Sth and the gear shift step (G) detected by the gear position sensor Sg. Thus, the traveling state can be detected reliably by the respective sensors, so that the torque adequate to the traveling state can be distributed to the sub-drive wheels. Additionally, in the embodiment described above, since a command current is applied to the electromagnetic coil 19, which enables the electromagnetic clutch 16 to transmit to the sub-drive wheels the command torque (T) corresponding to the traveling state of the vehicle, the adequate torque can be transmitted to the sub-drive wheels with a simplified construction, so that improvements can be attained in the stability of the vehicle as well as in the fuel efficiency.

(Second Embodiment)

The second embodiment of the present invention will be described with reference to the accompanying drawings. In the second embodiment, a four-wheel drive vehicle incorporating a torque distribution control device takes the same construction as shown in FIG. 1, and thus, the description which has been given in the first embodiment with reference to FIG. 1 makes a part of the description for the four-wheel drive vehicle in the second embodiment. Also, an electronic control circuit of the same configuration as shown in FIG. 2 except for the gear position sensor Sg is employed in the second embodiment. Thus, except for that part regarding the gear position sensor Sg, the description which has been given in the first embodiment with reference to FIG. 2 also makes a part of the description in this second embodiment. Further, the second embodiment uses the same pre-torque map as shown in FIG. 4, and thus, the description which has been given in the first embodiment with reference to FIG. 4 also makes a part of the description in the second embodiment. Accordingly, the second embodiment will be described with reference to FIGS. 1, 2, 4 and 7 to 10 hereinafter.

Figure 7:
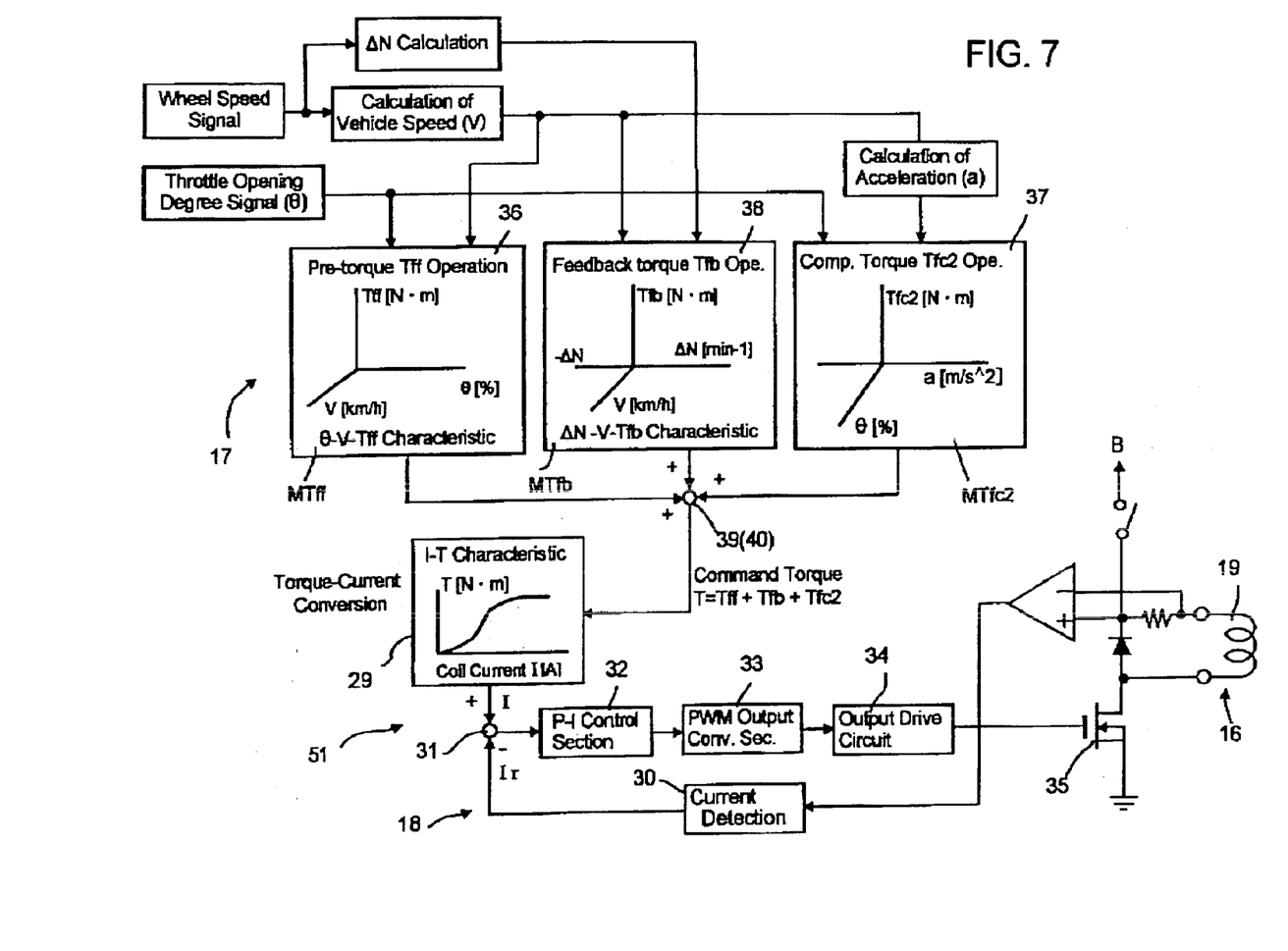
FIG. 7 is a block diagram showing the functions of those constituting the torque distribution control device according to the second embodiment.

Referring now to FIG. 7, there is shown an electronic control device 17 used in the second embodiment. The electronic control device 17 calculates a command current (I) to be applied to the electromagnetic coil 19, for transmission by the electromagnetic clutch 16 of the calculated command torque (T) to the sub-drive wheel is or the rear wheels Wrl, Wrr and outputs the calculated command current (I) to the electric current control circuit 18. The relation between the command torque (T) transmitted by the electromagnetic clutch 16 and the command electric current (I) has been stored in the ROM 26 in the form of a torque-current map 29 of the same configuration as that shown in FIG. 3, and the command current (I) depending on the command torque (T) is read out from the torque-current map 29. In an alternative form, the command current may be obtained from an equation defining the relation between the command torque (T) and the command electric current (I).

The current control circuit 18 takes the same configuration as that shown in FIG. 3, and thus, the description which has been made regarding this current control circuit 18 in the aforementioned first embodiment makes a part of the description in this second embodiment. The torque current map 29 and the electric current control circuit 18 constitute current application means 51 for applying to the electromagnetic clutch 19 of the electromagnetic clutch 16 a command current (I) that is necessary for the electromagnetic clutch 16 to transmit a command torque (T).

The electronic control device 17 is provided with pre-torque operation means 36 for choosing or determining a pre-torque Tff to be transmitted to the sub-drive wheels Wrl, Wrr, based on the vehicle speed (V) and the throttle opening degree (θ) and compensation torque operation means 37 for choosing or determining a compensation torque Tfc2 to be used to compensate the pre-torque Tff therefor, based on the acceleration (a) and the throttle opening degree (θ). The control device 17 is further provided with feedback torque operation means 38 for choosing or determining a feedback torque Tfb based on the rotational speed difference ΔN between the drive wheels Wfl, Wfr and the sub-drive wheels Wrl, Wrr and the vehicle speed (V) and command torque operation means 39 for calculating a command torque (T) by the addition of the pre-torque Tff, the compensation torque Tfc2 and the feedback torque Tfb.

The vehicle speed (V) is calculated from the average value of the rotational numbers of the sub-drive wheels Wrl, Wrr detected by the wheel speed sensors Srl, Srr. The throttle opening degree θ represents by percentages the ratio of the opening of the throttle valve 24 detected by the throttle sensor Sth to the full opening thereof. The acceleration (a) is obtained by calculating the change in the wheel speeds per unit time period.

In the pre-torque operation means 36, a pre-torque map MTff which has set pre-torques Tff to be transmitted to the sub-drive wheels Wrl, Wrr in correspondence to various vehicle speeds (V) and various throttle opening degrees (e) is registered in the ROM 26. Thus, when a torque distribution program is executed as will be described with reference to FIG. 10, a pre-torque Tff which corresponds to the detected vehicle speed (V) and the detected throttle opening degree (θ) is read out from the pre-torque map MTff. This pre-torque map MTff takes the same mapping configuration as shown in FIG. 4, wherein the whole trend in change of the pre-torque Tff is as described earlier in the aforementioned first embodiment. In a modified form of the second embodiment, the pre-torque Tff may be calculated by the use of a predetermined equation taking the vehicle speed (V) and the throttle opening degree (θ) as parameters thereof, in place of being obtained from the pre-torque map MTff.

The torque adequate to be distributed to the sub-drive wheels also varies in magnitude in dependence on the vehicle acceleration (a) and the throttle opening degree (θ). More specifically, when the driver has step on the accelerator or gas pedal for acceleration, but the acceleration (a) does not increase sufficiently to remain small, it is necessary that the pre-torque Tff be compensated toward the plus side thereby to increase the torque distribution to the sub-drive wheels so that the acceleration reflecting the driver's will can be realized with the four wheels securely gripping the road surface. Further, when for the engine braking, the driver lets the gas pedal return thereby to make the throttle opening degree (θ) small in order that the deceleration (the absolute value of a negative acceleration) is made medium or large, the traveling can be stabled by compensating the pre-torque toward the plus side thereby to distribute a larger torque to the sub-drive wheels. When for the engine braking on a descent, the driver lets the gas pedal return thereby to make the throttle opening degree (θ) small, but when the descent causes the vehicle acceleration to be medium or large, it is necessary to compensated the pre-torque Tff toward the plus side thereby to increase the torque distribution to the sub-drive wheels in order that the engine braking can work securely with the four wheels. When for a constant speed traveling, the driver lets the gas pedal return thereby to make the acceleration (a) a positive or negative small value, it can be done that the pre-torque Tff is compensated toward the minus side in order that the torque distribution to the sub-drive wheels is made small to reduce the fuel consumption. In order to reflect the aforementioned characteristics on the pre-torque Tff, there is provided compensation torque operation means 37 for obtaining a compensation torque Tfc2 which is used in compensating the pre-torque Tff based on the acceleration (a) and the throttle opening degree (θ).

Figure 8:
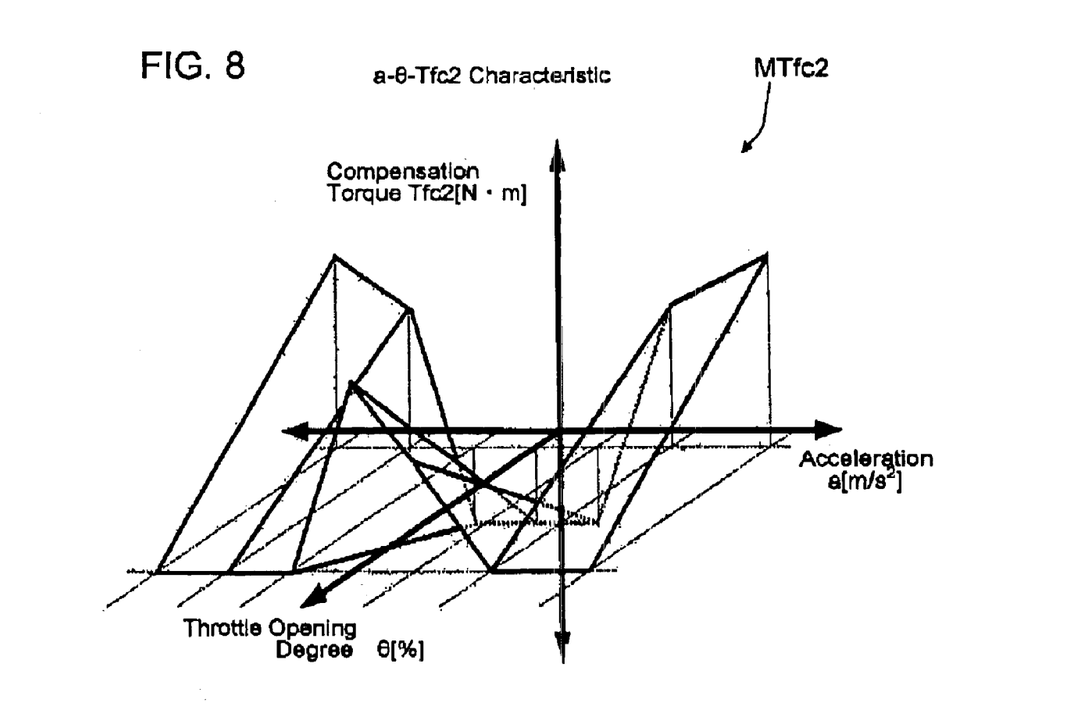
FIG. 8 is an explanatory view representing a compensation torque map used in the second embodiment.
Figure 9:
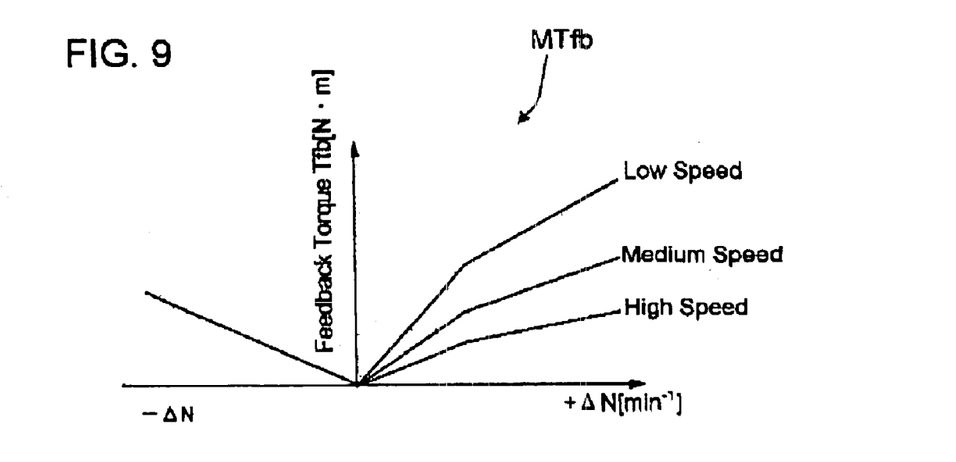
FIG. 9 is an explanatory view representing a feedback torque map used in the second embodiment.

In the compensation torque operation means 37, a compensation torque map MTfc2 wherein various compensation torques Tfc2 have been set in correspondence to the various accelerations (a) and the various throttle opening degrees (θ) is in the ROM 26. When the torque distribution control program is executed as described later, a compensation torque Tfc2 is obtained from the compensation torque map MTfc2 based on the acceleration (a) and the throttle opening degree (θ). As shown in FIG. 8, the compensation torque map MTfc2 has a general characteristic that within the zone where the absolute value of the acceleration (a) and the throttle opening degree (θ) are both small, the compensation torque Tfc2 is set at the minus side wherein it increases towards zero as the throttle opening degree (θ) increases, and that in the zone where the throttle opening degree (θ) is large, but the absolute value of the acceleration (a) is small, the compensation torque Tfc is set at the plus side wherein it increases larger as the absolute value of the acceleration (a) is made smaller. Also in the general characteristic, within the zone where the absolute value of the acceleration (a) is large, the compensation torque Tfc2 increases gradually from zero toward the plus side as the throttle opening degree (θ) decreases from a larger value to a smaller value.

In the feedback torque operation means 38, a feedback torque map MTfb wherein various feedback torques Tfb have been set in relation with the various rotational speed differences ΔN between the drive wheels and the sub-drive wheels and the various vehicle speed (V) is registered in the ROM 26. Thus, when the torque distribution control program is executed as described later, a feedback torque Tfb is read out from the feedback torque map MTfb in dependence on the rotational speed difference ΔN between the drive wheels and the subdrive wheels and the vehicle speed (V). On the feedback torque map MTfb exemplified in FIG. 9, several feedback torque curves Tfb for several distinctive vehicle speeds (V) have been sets each taking various rotational speed differences ΔN as parameters therefor. In the general characteristic of the feedback torque map MTfb, the feedback torque Tfb is zero when the rotational speed difference ΔN is zero and increases at a constant gradient as the rotational speed difference ΔN increases within the plus zone, although its gradient is made small within a zone that the rotational speed difference ΔN exceeds a predetermined value. In the relation with the vehicle speed V, the feedback torque Tfb is made large at a low vehicle speed (V) and small at a high vehicle speed (V). Where the rotational speed difference ΔN is of the minus zone, the feedback torque Tfb increases in proportion to the increase in the absolute value of the rotational speed difference ΔN irrespective of the vehicle speed (V).

Figure 10:
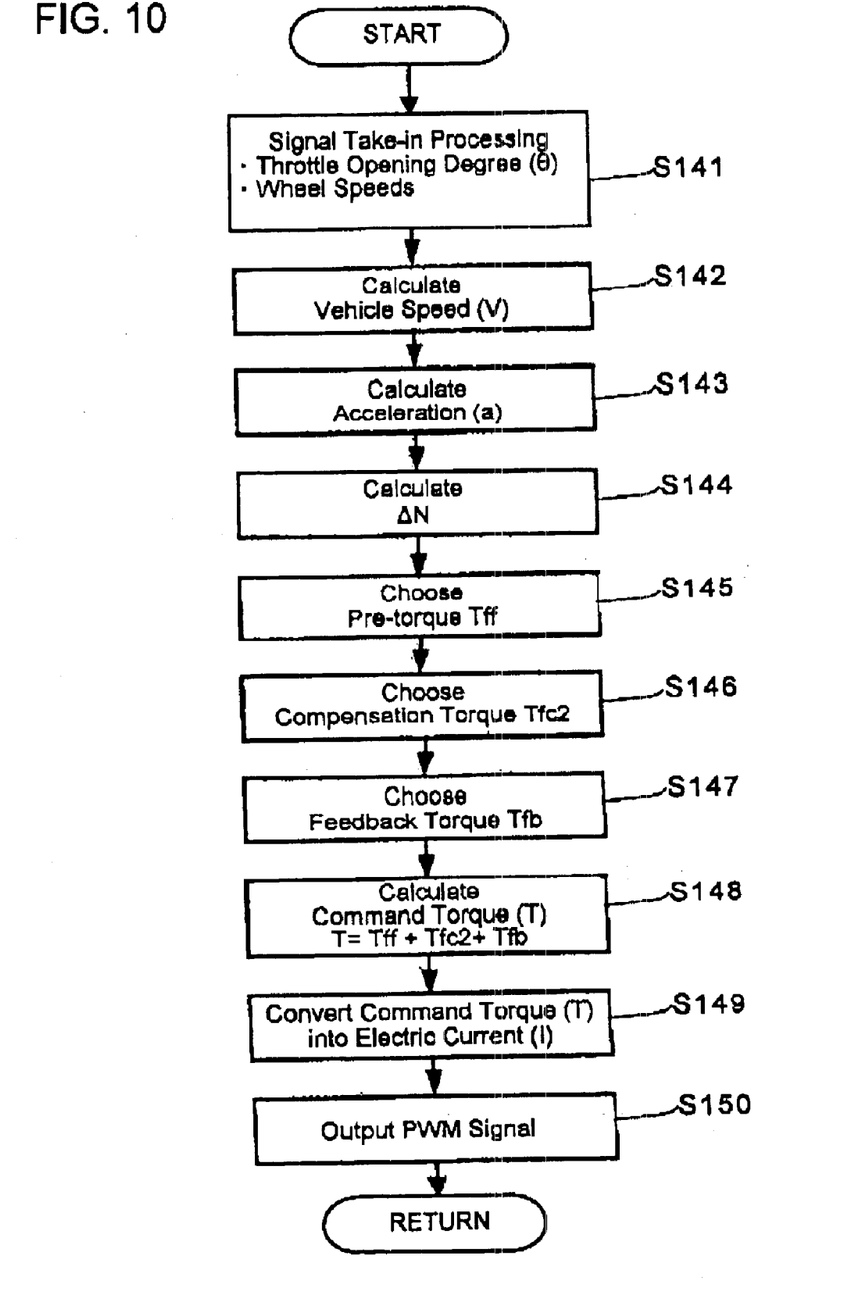
FIG. 10 is a flow chart showing another torque distribution program executed by the electronic control circuit in the second embodiment.

The operation of the torque distribution control device for a four-wheel vehicle as constructed above in the second embodiment will be described hereafter with reference to FIG. 10. The CPU 25 executes a torque distribution control program shown in FIG. 10 at a minute time interval Δt. First of all, the CPU 25 executes a processing to take the signals from the wheel speed sensors Sfl, Sfr, Srl, Srr and the throttle sensor Sth therein at step S141. Then, at step S142, the vehicle speed (V) is calculated based on the average value of the rotational numbers of the sub-drive wheels Wrl, Wrr detected by the wheel speed sensors Srl, Srr. At step S143, an increment ΔV of the vehicle speed V for the minute time interval Δt is calculated, and the acceleration (a=ΔV/Δt) of the vehicle is then calculated. At step S144, the average value of the rotational numbers of the sub-drive wheels Wrl, Wrr is subtracted from the average value of the rotational numbers of the drive wheels Wfl, Wfr detected by the wheel speed sensors Sfl, Sfr to calculate the rotational speed difference ΔN between the drive wheel and the sub-drive wheels. Then, the routine proceeds to step S145, wherein a pre-torque Tff which meets the calculated vehicle speed (V) and a throttle opening degree (θ) detected by the throttle sensor Sth is chosen or determined from the pre-torque map MTff in a feed forward sense. Thereafter, a compensation torque Tfc2 which meets the acceleration (a) and the throttle opening degree (θ) is chosen from the compensation torque map MTfc at step S146. Then, at step S147, a feedback torque Tfb which meets the rotational speed difference ΔN and the vehicle speed (V) is chosen from the feedback torque map MTfb. The feedback torque Tfb chosen from the feedback torque map MTfb is modified in the proportional allotment method by the difference between the vehicle speed (V) and that indicated as parameter on the feedback torque map MTfb. Subsequently, the pre-torque Tff, the compensation torque Tfc2 and the modified feedback torque Tfb are added to calculate a command torque (T). In terms of adding the compensation torque Tfc2 to the pre-torque Tff, the step S148 functions as compensated pre-torque operation means 40 for compensating the pre-torque Tff based on the throttle opening degree (θ) and the acceleration (a) of the vehicle to obtain a compensated pre-torque. Further, in terms of adding the pre-torque Tff, the compensation torque Tfc2 and the feedback torque Tfb, the step S148 also functions as command torque calculation means 39 for obtaining the command torque (T) by adding the compensated pre-torque and the feedback torque Tfb.

At step S149, a command electric current (I) which is to be applied to the electromagnet 19 of the electromagnetic clutch 16 to transmit the command torque (T) is chosen from the torque current map 29 which has various command electric currents (I) for respective command torques (T), and the command electric current (I) chosen is output to the electric current control circuit 18 at step S150. The electric current control circuit 18 amplifies the difference between the command current (I) and the real current (Ir) flowing through the electromagnetic coil 19 of the electromagnetic clutch 16 and performs the pulse width modulation of the amplified difference to output the modulated difference to the switching transistor 35, whereby the command current (I) is applied to the electromagnetic coil 19. As a consequence, the electromagnetic clutch 16 transmits the command torque (T) from the first propeller shaft 15 to the second propeller shaft 20, whereby the command torque (T) is distributed to the rear wheels Wrl, Wrr as the sub-drive wheels.

Thus, when the driver has stepped on the gas pedal, but the acceleration (a) does not increase sufficiently and remains small, the pre-torque Tff is compensated toward the plus side, thereby to increase the torque distribution to the sub-drive wheels, so that the acceleration reflecting the driver's will can be realized with the four wheels securely gripping the road surface. Further, when for the engine braking, the driver lets the gas pedal return thereby to make the deceleration moderate or large, or when the descent causes the acceleration to be moderate or large, the pre-torque Tff is compensated toward the plus side thereby to increase the torque distribution to the sub-drive wheels, so that the engine braking can work securely with the four wheels. When for a constant speed traveling, the driver lets the gas pedal return thereby to make the acceleration (a) a positive or negative small value, the pre-torque Tff is compensated toward the minus side, so that the torque distribution to the subdrive wheels is made small to reduce the fuel consumption.

The compensation torque map MTfc2 in the foregoing second embodiment may be modified into a two-axis map with rectangular axes respectively representing the acceleration (a) and the throttle opening (e), and the area of the two axis plan is partitioned off into plural areas which define various coefficients for use in multiplication with a pre-torque Tff taken out from the pre-torque map MTff. Thus, each pre-torque Tff taken out from the pre-torque map MTff can be modified as it is multiplied with, e.g., one and a half, a coefficient selected from the modified compensation torque map MTfc when the absolute value of the acceleration (a) is medium or large and when the throttle opening degree (θ) is small.

In the second embodiment described above, since the feedback torque Tfb is determined in the feedback sense based on the rotational speed difference ΔN between the drive wheels and the sub-drive wheels and the vehicle speed (V), the torque distribution to the sub-drive wheels Wrl, Wrr can be done with the traveling state being grasped precisely. Further, since the compensation torque Tfc2 is determined based on the throttle opening degree (θ) and the acceleration/deceleration (a) of the vehicle and then, is added to the pre-torque Tff to calculate the compensated pre-torque, the compensation torque Tfc2 which directly reflects the driver's will is added to the pre-torque Tff, so that the compensated pre-torque which meets the traveling state can be obtained.

Furthermore, in the foregoing second embodiment, the compensated pre-torque is calculated by multiplying the pre-torque Tff with a coefficient which is set based on the throttle opening degree (θ) and the acceleration/deceleration (a) of the vehicle. Thus, with such a simple construction as to multiply the coefficient with the pre-torque Tff which is determined based on the vehicle speed (V) and the throttle opening degree (θ), the adequate torque distribution to the sub-drive wheels Wrl, Wrr can be done with the driver's will being reflected directly. Additionally, in the second embodiment described above, since a command current (I) is applied to the electromagnetic coil 19, which enables the electromagnetic clutch 16 to transmit to the sub-drive wheels Wrl, Wrr the command torque (T) corresponding to the traveling state of the vehicle, the adequate torque can be transmitted to the sub-drive wheels Wrl, Wrr with a simplified construction, so that improvements can be attained in the stability of the vehicle as well as in the fuel efficiency.

Obviously, numerous modifications and variations of the present invention are possible in light of the above teachings. It is therefore to be understood that within the scope of the appended claims, the present invention may be practiced otherwise than as specifically described herein.

What is claimed is:

1. A torque distribution control device for a four-wheel drive vehicle having a torque transmission clutch for distributing the torque transmitted from an engine to prime drive wheels and to sub-drive wheels, said control device comprising:

pre-torque operation means for determining a pre-torque to be transmitted to said sub-drive wheels based on a vehicle speed, a throttle opening degree and the gear shift step of a transmission;

compensation torque operation means for determining a compensation torque based on the rotational speed difference between said prime drive wheels and said sub-drive wheels; and command torque operation means for determining a command torque by the addition of said pre-torque and said compensation torque;

wherein said torque transmission clutch is controlled based on said command torque input from said command torque operation means.

2. A torque distribution control device as set forth in claim 1, wherein said compensation torque operation means determines said compensation torque based on said rotational speed difference between said prime drive wheels and said sub-drive wheels and said vehicle speed.

3. A torque distribution control device as set forth in claim 1, wherein said pre-torque operation means is provided with plural pre-torque maps on each of which various pre-torques to be transmitted to said sub-drive wheels are set based on various vehicle speeds and various throttle opening degrees, respectively for the gear shift steps of said transmission, and wherein said pre-torque operation means determines said pre-torque by the selection of one of said plural pre-torque maps corresponding to a selected one of said gear shift steps.

4. A torque distribution control device as set forth in claim 1, wherein said pre-torque operation means is provided with a pre-torque map on which various pre-torques to be transmitted to said sub-drive wheels are set based on various vehicle speeds and various throttle opening degrees, for at least one gear shift step of said transmission, and wherein said pre-torque operation means performs a modification operation so that said pre-torque determined from said pre-torque map based on said vehicle speed and said throttle opening degree is modified in dependence on the difference between said one gear shift step and a selected gear shift step.

5. A torque distribution control device as set forth in claim 1, wherein said pre-torque operation means determines said pre-torque to be transmitted to said sub-drive wheels based on said vehicle speed calculated from wheel speeds which are detected by wheel speed sensors, said throttle opening degree detected by a throttle sensor, and said gear shift step detected by a gear position sensor.

6. A torque distribution control device as set forth in claim 1, wherein said torque transmission clutch is an electromagnetic clutch, further comprising a current control circuit for applying to an electromagnetic coil of said electromagnetic clutch a command current which is necessary for said electromagnetic clutch to transmit said command torque to said sub-drive wheels.

7. A torque distribution control device for a four-wheel drive vehicle having a torque transmission clutch for distributing the torque transmitted from an engine to prime drive wheels and to sub-drive wheels, said control device comprising:

pre-torque operation means for determining a pre-torque to be transmitted to said sub-drive wheels based on a vehicle speed and a throttle opening degree;

compensated pre-torque operation means for compensating said pre-torque based on said throttle opening degree and the acceleration/deceleration of said vehicle;

feedback torque operation means for determining a feedback torque based on the rotational speed difference between said prime drive wheels and said sub-drive wheels;

command torque operation means for calculating a command torque by the addition of said compensated pre-torque and said feedback torque;

wherein said torque transmission clutch is controlled based on said command torque.

8. A torque distribution control device as set forth in claim 7, wherein said feedback torque operation means determines said feedback torque based on said rotational speed difference between said prime drive wheels and said sub-drive wheels and said vehicle speed.

9. A torque distribution control device as set forth in claim 7, further comprising compensation torque operation means for determining a compensation torque based on said throttle opening degree and said acceleration/deceleration of said vehicle, wherein said compensated pre-torque operation means calculates said compensated pre-torque by adding said compensation torque to said pre-torque.

10. A torque distribution control device as set forth in claim 7, wherein said compensated pre-torque operation means determines said compensated pre-torque by multiplying said pre-torque with a coefficient which is set in dependence on said throttle opening degree and said acceleration/deceleration of said vehicle.

11. A torque distribution control device as set forth in claim 7, wherein said torque transmission clutch is constituted by an electromagnetic clutch, said control device further including electric current application means for applying a command electric current, which is necessary for said electromagnetic clutch to transmit said command torque, to an electromagnetic coil of said electromagnetic clutch.

* * * * *